United States Patent
Enright et al.

(10) Patent No.: US 9,740,595 B2
(45) Date of Patent: Aug. 22, 2017

(54) METHOD AND APPARATUS FOR PRODUCING A BENCHMARK APPLICATION FOR PERFORMANCE TESTING

(71) Applicant: FUJITSU LIMITED, Kawasaki-shi, Kanagawa (JP)

(72) Inventors: Jim Enright, Slough (GB); Nicholas Wilson, Middlesex (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/926,825

(22) Filed: Oct. 29, 2015

(65) Prior Publication Data

US 2016/0140025 A1 May 19, 2016

(30) Foreign Application Priority Data

Nov. 17, 2014 (EP) .................................... 14193482

(51) Int. Cl.
*G06F 9/44* (2006.01)
*G06F 11/36* (2006.01)
*G06F 11/34* (2006.01)

(52) U.S. Cl.
CPC ...... *G06F 11/3684* (2013.01); *G06F 11/3414* (2013.01); *G06F 11/3428* (2013.01); *G06F 11/3688* (2013.01); *G06F 11/3692* (2013.01); *G06F 11/3485* (2013.01)

(58) Field of Classification Search
CPC ............. G06F 11/3414; G06F 11/3428; G06F 11/3485; G06F 11/3684; G06F 11/3688; G06F 11/3692

USPC .................................................. 717/127–133
See application file for complete search history.

(56) References Cited

U.S. PATENT DOCUMENTS

| | | | | | |
|---|---|---|---|---|---|
| 6,145,121 | A | * | 11/2000 | Levy ................... | G06F 11/3461 703/22 |
| 7,831,325 | B1 | * | 11/2010 | Zhang ................... | G06F 9/5044 700/108 |
| 8,087,001 | B2 | * | 12/2011 | Hoyek ................ | G06F 11/3688 717/124 |
| 8,311,776 | B2 | * | 11/2012 | Blackledge ......... | H04L 43/0888 324/762.01 |
| 2004/0111708 | A1 | | 6/2004 | Calder et al. | |

(Continued)

OTHER PUBLICATIONS

Yubing Wang, "An Adaptable Benchmark for MPFS Performance Testing", 2002, Thesis, Worcester Polytechnic Institute , pp. i-vi, 1-66.*

(Continued)

*Primary Examiner* — Ted T Vo
(74) *Attorney, Agent, or Firm* — Staas & Halsey LLP

(57) ABSTRACT

A method of producing a benchmark application for testing input/output—I/O—settings of a computer application, the method comprising: compiling trace data relating to operations to be executed by the computer application; grouping the trace data into one or more phases, based on different stages in the execution of the computer application to which the operations relate; identifying patterns in the trace data and comparing the patterns; producing simplified trace data in which trace data having similar patterns are combined; and outputting a benchmark application which includes the simplified trace data and information indicating where the trace data have been combined.

13 Claims, 19 Drawing Sheets

(56) References Cited

U.S. PATENT DOCUMENTS

2005/0120341 A1 6/2005 Blumenthal et al.
2006/0230317 A1 10/2006 Anderson
2009/0276191 A1 11/2009 Bell, Jr. et al.
2013/0227529 A1 8/2013 Li et al.

OTHER PUBLICATIONS

Ming Xia, "A performance benchmark method for comparing open source Java application servers", 2009, retrieved from http://www.ibm.com/developerworks/library/os-perfbenchmk/ , 10 pages.*
European Search Report mailed May 7, 2015, in corresponding European Application No. 14193482.8.
Alawneh et al. "Identifying Computational Phases from Inter-Process Communication Traces of HPC Applications", *2012 20th IEEE International Conference on Program Comprehension (ICPC)*, 2012.
Casas et al. "Automatic Phase Detection of MPI Applications", *Parallel Computing: Architectures, Algorithms and Applications*, John von Neumann Institute for Computing, NIC Series, vol. 38, pp. 129-136, 2007.
Meswani et al. "Modeling and Predicting Disk I/O Time of HPC Applications", *2010 DoD High Performance Computing Modernization Program Users Group Conference*, pp. 478-486, 2010.
Mesnier et al. "//Trace: Parallel Trace Replay with Approximate Causal Events", *Proceedings of the 5th USENIX Conference on File and Storage Technologies*, Feb. 13-16, 2007.
Kim et al. "IOPin: Runtime Profiling of Parallel I/O in HPC Systems", *2012 SC Companion: High Performance Computing, Networking Storage and Analysis*, 2012.
Vijayakumar et al. "Scalable I/O Tracing and Analysis", *Supercomputing Parallel Data Storage Workshop*, Nov. 15, 2009.
Geimer et al. "The SCALASCA Performance Toolset Architecture", *Concurrency and Computation: Practice and Experience—Scalable Tools for High-End Computing*, vol. 22, Issue 6, pp. 702-719, Apr. 2010.
IOR HPC Benchmark. Retrieved from http://sourceforge.net/projects/ior-sio/. 2013.
IOzone Filesystem Benchmark. Retrieved from http://www.iozone.org/. 2006.
Bonnie Benchmark. Retrieved from http://textuality.com/bonnie. 1990.
Getting Started with Intel MPI Benchmarks 4.1. Retrieved from http://software.intel.com/en-us/articles/intel-mpi-benchmarks. Oct. 9, 2013.
Behzad et al. "Taming Parallel I/O Complexity with Auto-Tuning", 2013.

* cited by examiner

```
  :
  :
! Read in file to start simulation

! Process 0 - reads in restart file ...
IF (my_rank == 0) THEN
  OPEN(UNIT=22, FILE='restart_file', ACTION="READ", FORM="UNFORMATTED")
  READ(22) restart_data
END IF
  :
  :
! ... and scatter from Process 0 to all Process
CALL MPI_SCATTER(restart_data, bufsize_local, type, bufsize_local, type, 0, MPI_COMM_WORLD, ierr)
  :
  :
```

FIG. 5

```
$ cat example_serialIO.f90

PROGRAM example_serial_io

! Variable initialisation stage
max_ts = 10
dump_ts = (/ 5, 10 /)
...
...

! MPI initialisation stage
CALL MPI_INIT(ierr)

CALL MPI_COMM_RANK(MPI_COMM_WORLD, my_rank, ierr)
CALL MPI_COMM_SIZE(MPI_COMM_WORLD, num_procs, ierr)
...
...

! Rank 0 - read in restart file ....
IF (my_rank == 0) THEN
    OPEN(UNIT=22, FILE='restart_file', ACTION="READ", FORM="UNFORMATTED")
    READ(22) restart_data
END IF
...
...
! .... and scatter from rank 0 to all ranks
```

FIG. 6

```
CALL MPI_SCATTER(restart_data, bufsize_local, type, bufsize_local, type, 0, MPI_COMM_WORLD, ierr)

! Start simulation timestepping
DO WHILE (timestep <= max_ts)

! Perform simulation calculation
    ...
    ...

! Write a restart file dump on this timestep?
    IF (timestep = dump_ts) THEN
        ! Gather the data to rank 0
        CALL MPI_GATHER(restart_data, bufsize_local, type, bufsize_local, type, 0, MPI_COMM_WORLD, ierr)

! Rank 0 writes the dump file....
        IF (my_rank == 0) THEN
            ! Create filename using by concatenating string & timestep
            ...
            OPEN(UNIT=26, FILE=filename, ACTION="WRITE", FORM="UNFORMATTED")
            WRITE(26) restart_data
        END IF
    END IF

END DO

END PROGRAM example_serial_io
```

FIG. 6 (continued)

```
$ cat example_serialIO_IOTrace.xml

<iotrace id="example_serialIO_3481">
   <application>
       <name> example_serial_IO.f90 </name>
       <processes> 4 </processes>
       <start> 13:05:30 </start>
       </end> 13:12:00 </end>
   </application>

<iophase>
      <name> initialisation </name>
      <operation name="open">
         <process> 0 </process>
         <api> posix </api>
         <filename> restart_file </filename>
         <start> 13:05:45 </start>
         <end> 13:05:47 </end>
      </operation>
      <operation name="read" >
         <process> 0 </process>
         <api> posix </api>
         <filesize> 1024MB </filesize>
         <start> 13:05:50 </start>
         <end> 13:06:50 </end>
      </operation>
      <operation name="scatter" >
         <root> 0 </root>
         <received> 0,1,2,3 </received>
         <datasize> 256MB </datasize>
         <start> 13:07:00 </start>
         <end> 13:07:30 </end>
       </operation>
    </iophase>

<iophase>
       <name> restart_dump_1 </name>
       <operation name="gather" >
          <root> 0 </root>
          <sent> 0,1,2,3 </sent>
          <datasize> 256MB </datasize>
          <start> 13:08:50 </start>
          <end> 13:09:10 </end>
```

FIG. 7

```xml
      </operation>
      <operation name="open">
        <process> 0 </process>
        <api> posix </api>
        <filename> restart_file_ts02 </filename>
        <start> 13:09:11 </start>
        <end> 13:09:15 </end>
      </operation>
      <operation name="write" >
         <process> 0 </process>
         <api> posix </api>
         <filesize> 256MB </filesize>
         <start> 13:09:16 </start>
         <end> 13:09:46 </end>
      </operation>
   </iophase>

<iophase>
      <name> restart_dump_2 </name>
      <operation name="gather" >
         <root> 0 </root>
         <sent> 0,1,2,3 </sent>
         <datasize> 256MB </datasize>
         <start> 13:11:30 </start>
         <end> 13:11:40 </end>
      </operation>
      <operation name="open">
        <process> 0 </process>
        <api> posix </api>
        <filename> restart_file_ts10 </filename>
        <start> 13:11:42 </start>
        <end> 13:11:45 </end>
      </operation>
      <operation name="write" >
         <process> 0 </process>
         <api> posix </api>
         <filesize> 256MB </filesize>
         <start> 13:11:46 </start>
         <end> 13:11:56 </end>
      </operation>
   </iophase>

</iotrace>
```

FIG. 7 (continued)

```
<iophase>
    <name> restart_dump_1 </name>
    <operation name="gather" >
        <root> 0 </root>
        <sent> 0,1,2,3 </sent>
        <datasize> 256MB </datasize>
        <start> 13:08:50 </start>
        <end> 13:09:10 </end>
    </operation>
    <operation name="open">
        <process> 0 </process>
        <api> posix </api>
        <filename> restart_file_ts02 </filename>
        <start> 13:09:11 </start>
        <end> 13:09:15 </end>
    </operation>
    <operation name="write" >
        <process> 0 </process>
        <api> posix </api>
        <filesize> 256MB </filesize>
        <start> 13:09:16 </start>
        <end> 13:09:46 </end>
    </operation>
</iophase>

<iophase>
    <name> restart_dump_2 </name>
    <operation name="gather" >
        <root> 0 </root>
        <sent> 0,1,2,3 </sent>
        <datasize> 256MB </datasize>
        <start> 13:11:30 </start>
        <end> 13:11:40 </end>
    </operation>
    <operation name="open">
        <process> 0 </process>
        <api> posix </api>
        <filename> restart_file_ts10 </filename>
        <start> 13:11:42 </start>
        <end> 13:11:45 </end>
    </operation>
    <operation name="write" >
        <process> 0 </process>
        <api> posix </api>
        <filesize> 256MB </filesize>
        <start> 13:11:46 </start>
        <end> 13:11:56 </end>
    </operation>
</iophase>
```

Reduce number of benchmarks to run

I/O Phase Analysis →

FIG. 8

```
<iophase>
    <name> restart_dump </name>
    <group>
        <g1> restart_dump_1 </g1>
        <g2> restart_dump_2 </g2>
    </group>
    <operation name="gather" >
        <root> 0 </root>
        <sent> 0,1,2,3 </sent>
        <datasize> 256MB </datasize>
    </operation>
    <operation name="open">
      <process> 0 </process>
      <api> posix </api>
        <filename> restart_file </filename>
    </operation>
    <operation name="write" >
        <process> 0 </process>
        <api> posix </api>
        <filesize> 256MB </filesize>
    </operation>
</iophase>
```

FIG. 8 (continued)

```
...
...
! Open the file on Process 0
IF (my_rank == 0) THEN
    OPEN(UNIT=22, FILE='restart_file', ACTION="READ", FORM="UNFORMATTED")
END IF ! Read in buffer element from file to Process 0
IF (my_rank == 0) THEN
    DO I = 1, bufsize
        READ(22) restart_data(i)

! Work out which process to send data to
        dest= (I - 1) / bufsize_local

!Sends buffer to dest process
        IF (dest == 0) THEN
            restart_buffer(i) = restart_data(i)
        ELSE
            CALL MPI_SEND(restart_buffer(i), 1, type, dest, tag, MPI_COMM_WORLD, ierr)
        END IF END DO
ELSE
    CALL MPI_RECV(restart_data, 1, type, 0, tag, MPI_COMM_WORLD, status, ierr)
END IF
...
...
```

FIG. 9

```
<iophase>
    <name> initialisation_open </name>
    <operation name="open">
        <process> 0 </process>
        <api> posix </api>
        <filename> restart_file </filename>
        <start> 13:05:45 </start>
        <end> 13:05:47 </end>
    </operation>
</iophase>

<iophase>
    <name> initialisation_read_1 </name>
    <operation name="read">
        <process> 0 </process>
        <api> posix </api>
        <size> 1MB </size>
        <start> 13:05:45 </start>
        <end> 13:05:47 </end>
    </operation>
    <operation name="send">
        <source> 0 </source>
        <destination> 1 </destination>
        <datasize> 1MB </datasize>
        <start> 13:05:49 </start>
        <end> 13:05:50 </end>
    </operation>
</iophase>
...
...
<iophase>
    <name> initialisation_read_1024 </name>
    <operation name="read">
        <process> 0 </process>
        <api> posix </api>
        <size> 1MB </size>
        <start> 13:35:35 </start>
        <end> 13:35:37 </end>
    </operation>
    <operation name="send">
        <source> 4 </source>
        <destination> 4 </destination>
        <datasize> 1MB </datasize>
        <start> 13:35:39 </start>
        <end> 13:35:40 </end>
    </operation>
</iophase>
```

Identify possible inefficient IO patterns...

I/O Phase Analysis →

...and generate new optimal I/O phase for benchmarking

FIG. 10

```
<iophase>
    <name> initialisation </name>
    <operation name="open">
        <process> 0 </process>
        <api> posix </api>
        <filename> restart_file </filename>
    </operation>
    <operation name="read" >
        <process> 0 </process>
        <api> posix </api>
        <size> 1024MB </size>
    </operation>
    <operation name="scatter" >
        <root> 0 </root>
        <received> 0,1,2,3,4 </received>
        <datasize> 256MB </datasize>
    </operation>
</iophase>
```

FIG. 10 (continued)

```
$ cat example_serialIO_input.in

/* Name and location of the benchmark trace file */
benchmark_file:
                                /home/test_user/example_serialIO_IOTrace.xml /* Which IO phases of trace file are enabled */
enable_phase:
                                initialisation;
                                restart_dump_1;

/* Which IO phases of trace file are disabled */
disable_phase:
                                restart_dump_2;

/* Define which elements to test at application layer of IO hierarchy */
application_layer:
                                serial_io;
                                parallel_io;
                                io_servers;
                                transaction_size;
                                io_buffering;

/* Define which elements to test at IO programming interface layer */
/* Here we just want to run POSIX IO tests */
api_layer:
                                posix;

/* Define which file systems to test. The location of the file system also needs to be specified */
fileSystem_layer:
                                nfs=/work_nfs;
                                lustre=/work_lustre;

/* Specify any additional IO tests to run.
   Here we run a read benchmark in addition to those tests in the trace file.
   Also the all benchmarks are run for a file size of 1024MB. */
additional_tests:
                                operation=read;
                                file_size=1024MB;
```

FIG. 11

METHOD AND APPARATUS FOR PRODUCING A BENCHMARK APPLICATION FOR PERFORMANCE TESTING

CROSS-REFERENCE TO RELATED APPLICATIONS

This application claims the benefit of European Application No. 14193482.8, filed Nov. 17, 2014, in the European Intellectual Property Office, the disclosure of which is incorporated herein by reference.

BACKGROUND

1. Field

The present invention relates to testing input/output (I/O) settings in a computer-executable application and in particular to a method and apparatus for producing a benchmark application relating to the computer-executable application for testing input/output—I/O—settings of the computer-executable application.

2. Description of the Related Art

There is an ever increasing amount of parallelism in the computational components in successive generations of High Performance Computing (HPC) architectures. I/O hierarchies are becoming more and more complex in order to meet the storage requirements of applications (programs) running on such systems.

Writing applications to efficiently utilize the storage hierarchy benefits from an in-depth knowledge of each layer of the I/O stack and an understanding of how the choice of different I/O programming styles, Application Programming Interface (API) libraries, and file system settings impact application performance.

Two approaches exist for understanding and testing the performance impact of these choices.

The first approach is to run the application with a parameter sweep of the various I/O settings. This gives an accurate picture of how the different settings affect performance. However, it is an impractical and a time-consuming approach as the full application needs to be run for each test.

The second approach is to run a lightweight I/O benchmark suite. These have been developed to run small timing tests that are representative of the I/O operations performed by the application. The problem with such benchmark suites is that they do not match exactly to the operations performed by the application and are generally a very simplified representation of the application, in terms of the level of detail available for testing for each operation. Also, they do not always capture the full set of operations that are involved, for example any communications necessary for gathering data before performing a write operation are often not captured.

I/O characteristics are becoming an increasingly significant bottleneck in the performance of parallel processing in parallel systems and parallel scientific applications. It is therefore important to ensure that an application uses efficient I/O settings to support scalable data movement between disks and distributed memories.

This is a difficult task as scientific applications, for example, have a wide range of I/O requirements depending on their access patterns, the types and sizes of files that are read and written, and the transaction size (the amount of data transferred each time by a process).

A survey of the I/O requirements of High Performance Computing (HPC) applications revealed the following:

Applications are mostly dominated by sequential reads and writes; random access of file data is rare.

Append-only write operations are the main type of I/O operation.

The I/O transaction sizes (the amount of data to be transferred each time by a process) vary widely—generally ranging from several kilobytes to ×10's of Megabytes.

Many applications have adopted one-file-per-process for I/O rather than parallel I/O.

Most applications use their own file-formats rather than portable, self-describing formats, such as HDF5 or NetCDF.

In addition to the I/O programming choices in the applications, there are a range of hardware and file systems options available which can have an impact on the overall I/O performance of an application.

It is therefore desirable to improve the speed of testing while reducing the processing burden and inaccuracies when carrying out such tests.

SUMMARY

Additional aspects and/or advantages will be set forth in part in the description which follows and, in part, will be apparent from the description, or may be learned by practice of the invention.

In an embodiment of a first aspect of the present invention there is provided a method of producing a benchmark application for testing input/output (I/O) settings of a computer application. The method comprises the steps of: compiling trace data relating to operations to be executed by the computer application; grouping the trace data into one or more phases, based on different stages in the execution of the computer application to which the operations relate; identifying patterns in the trace data and comparing the patterns; producing simplified trace data in which trace data having similar patterns are combined; and outputting a benchmark application which includes the simplified trace data and information indicating where the trace data have been combined.

Compiling trace data involves copying (tracing) data of operations (processes) involved in the execution of the application. The copied data may be called a "trace" application. One advantage of a trace being taken is so that the data (trace data) may be manipulated and tested without affecting the original data, so that the results of any testing may be applied subsequently to the original data once the desired settings, resulting in the desired effect, have been determined.

Preferably, trace data may be compiled relating to I/O operations, performed by the application, only. Such I/O operations may include reading and writing instructions to a disk as well as operations associated with the I/O operations such as inter-process communication to gather data for the writing process. Tracing only the I/O operations in this way has an advantage that less time is required to gather the initial trace information, so less storage is required to hold the trace data. If trace data is compiled relating to all operations of the application, a step of filtering out (identifying) the I/O operations may be implemented before the phase analysis stage.

The trace data are then divided into groups (corresponding to phases) based on different stages in the execution of the computer application to which the data relate. That is to say, some of the data will relate to operations involved in a specific phase, e.g. an initialization phase in which the operations, and thus corresponding data, relate to the initialization of the computer application. Typical operations associated with an initialization phase may include read operations. Further phases into which the data may be grouped include for example a time-stepping phase and a finalization phase. These are explained in more detail below. Computer applications may for example have only a single phase, in the sense that the operations involved in executing the computer application are all closely related and therefore are all grouped together. For example, the single phase may be the I/O phase of an application. In this case the I/O operations, for the same file (or files) and that occur during a defined execution window, from the I/O trace, can be grouped together. In another example, multiple I/O phases may exist for specific events such as files read for initialization, writing of status files during an iteration, and a final writing of data during the close-down stage.

Once the one or more phases are established, the data are then scanned in order to identify patterns in the data. Patterns may include similar operations which are repeated, multiple read and/or write operations to a single file, similar amounts of data involved in a read and/or write operation, etc. Any patterns identified in different phases are then compared. In the event of only a single phase, this comparison between phases will not take place, but instead a comparison of patterns identified will still be carried out and I/O benchmarks may be created and run to find appropriate settings for that phase.

The phases may be tested individually so as to avoid unnecessary processing. When similar patterns exist in different phases, the test results relating to patterns existing in a phase which has been tested may simply be applied to the similar patterns in subsequent phases, thus saving on unnecessary processing. Patterns within a single phase may also be compared, particularly in the event of only a single phase, as mentioned above and described in more detail below. The comparison between trace data may take into account the various fields in the data. The number of fields that are the same between the compared data may determine the level of similarity between the data. For example, if the process I/O operation (i.e. read/write operation), file size and processes involved in two phases are the same, then these I/O phases can be classed as being the same. In this case the benchmark suite (described further below) would be run for one phase but the results would apply to the two phases. Further to this, if the file name(s) used for the two phases are also the same and both occur within a relatively short interval then this might point to an inefficient I/O pattern. In this case a new benchmark suite may be generated where the I/O operation is performed for twice the file size.

The system may keep track of which I/O phase each benchmark is associated with. This will include the case where one benchmark represents two or more phases. In an implementation this may be implemented by a simple lookup array of benchmarks to I/O phases. This provides a simple solution when providing recommendations to developers for optimal I/O patterns rather than directly feeding the best settings back into the original application.

Once the similar patterns have been identified and compared with respect to the or each phase, the trace taken of the computer application is then simplified to exclude any repeated patterns, and in particular multiple instances of similar patterns identified between phases may be removed.

Once the trace has been simplified, a benchmark application is produced which includes the simplified trace data along with information indicating how the trace data has been simplified relative to the original trace.

A benchmark application or benchmark suite is a simplified representation of an application (computer application) to be tested, which may be used for such testing. Input/output parameters of a benchmark application are intended to respond in a similar manner to those of the application which the benchmark application represents. In this way, when input/output parameters are changed to determine the effect of such changes on the performance of an application, the changes observed in the benchmark application closely mirror those of the application. This allows factors such as efficiency, throughput and data flow to be tested on the benchmark application, with the results of those tests having direct implications for the corresponding factors of the application.

In essence, in an embodiment, the invention works by performing a trace of an application to capture the I/O and associated operations. The trace data is then processed to identify the I/O phases of the application. An analysis of the I/O phases allows inefficient I/O patterns to be spotted and to identify I/O phases with similar operations.

Optionally then, with this trace and I/O phase information, benchmark tests are created which test the various I/O settings at each level of the I/O hierarchy. The output of the benchmarks is used to recommend the optimal I/O settings for the application or potential optimizations to the source code to improve performance.

In this way, an embodiment of the invention can provide lightweight and quick I/O performance tests that closely match of the I/O operations performed by a computer application.

Optionally, an embodiment further includes testing the benchmark application to establish the performance of benchmark operations of the benchmark application.

Once the benchmark application is created, various tests, in particular tests relating to I/O settings in the benchmark application, may be carried out to establish which changes to I/O settings give improved performance. By carrying out such tests on the benchmark application, and not the original computer application, the time taken to carry out each individual test may be reduced and the processing overall may be simplified due to the simplified nature of the benchmark application relative to the original application.

Optionally, an embodiment further includes testing I/O settings of the benchmark application to identify inefficiencies in data flow through the system, and/or characteristics of a system, on which the computer application is executed.

The tests carried out may involve changing I/O settings in order to find appropriate settings to improve data flow during execution of the benchmark application, which represents the data flow during execution of the computer application. The characteristics of the system may include data buffer capacity, number of parallel processes being carried out simultaneously, maximum processing speed, accepted data format, etc. This allows I/O settings to be improved in relation to the system and also allows system characteristics which are inefficient to be highlighted.

Optionally, an embodiment further comprises outputting a report indicating performance of the benchmark operations and/or comprising recommendations for I/O settings, specific to each system on which the computer application is operable to be executed, for use in improving data flow.

Once the preferred I/O settings have been tested and established, a report is produced including information indicating what and how tests were carried out. This report can be used by expert technicians to adapt similar applications or similar systems to improve throughput and data flow. By reviewing performance figures for various I/O settings, desired effects may be weighed up against potential drawbacks in order to achieve a system and application which is carried out optimally, in the context of the performance desired by a programmer. The report may also include recommendations for improving performance, based on historic information collected in relation to the system.

Optionally, in an embodiment, the report comprises recommendations regarding at least one of access patterns, types of files to be read and written, sizes of files to be read and written, transaction sizes, and timings.

If a specific setting or factor is indicated to have a significant effect on performance, this may be highlighted in the report. Similarly, if a combination of factors has a desired effect or is shown to improve performance, this may be highlighted in the report and recommendations on how to maintain this improved performance may be indicated. Regarding I/O data flow, factors such as file size, transaction size (total file transfer size), read and write timings, etc. may have a large influence on performance. Managing these factors appropriately, such that parallel processes are carried out within a desired time frame, may assist in reducing bottlenecking of data flow during processing.

Optionally, in an embodiment, the compiling of the trace data further comprises extracting a chronology of operations that occur during execution of the computer application.

By determining a chronology (the temporal sequence) of operations, the operations may be reorganized so that data flow is improved. For example, if an operation, in a sequence of operations, is identified requiring a large amount of data to be read/written from/to a file, execution of that operation may be positioned in the sequence such that other required or important operations are placed ahead in the sequence and operations of lesser importance are positioned behind in the sequence. Important operations may include, amongst others, operations on which other operations are dependent, i.e. that must be completed before the dependent operations may be executed. Knowing the chronology of operations in parallel processing systems allows for each parallel sequence to be arranged such that there is always the possibility to place an important operation 'ahead of the queue', to be processed next, which would not be possible for example if all parallel processors are occupied with processing large operations simultaneously.

Optionally, in an embodiment, the trace data comprises information indicating a type and/or size of the data, relating to the operations, being read or written.

Having knowledge of the type and/or size of the data allows for a more comprehensive test of the I/O settings to be carried out such that a more informative report can be produced. Information indicating data type and/or size may further assist in identifying patterns in the trace data.

Optionally, in an embodiment, the testing of the benchmark application includes studying the effect on performance of changing I/O settings.

When testing performance, random or predetermined changes to the I/O settings may be carried out in order to determine the corresponding effect on performance. The performance of the benchmark application is considered to directly correlate to the performance of the original computer application.

Optionally, in an embodiment, where trace data having similar patterns have been combined, the testing of the benchmark application involves only testing a first instance of the trace data having a similar pattern and the result of testing the first instance of the trace data having a similar pattern is then applied to subsequent instances.

By avoiding repetition of similar tests on similar trace data patterns, the time taken to complete testing can be reduce without compromising the accuracy of the test results.

Optionally, in an embodiment, the trace data are grouped into at least an initialization phase, relating to reading input files, and a finalization phase, relating to writing re-start files, which allow operations to re-start following completion of testing.

An initialization phase and a finalization phase are typical of most computer applications. Many other phases may exist in addition to these two phases. Each phase is intended to group operations related to similar functions in the context of executing the computer application.

Optionally, in an embodiment, comparing patterns between phases comprises identifying phases including similar sets of operations which each involve accessing the same file.

One example of patterns which are likely to give similar results during testing is when similar operations or set of operations involve accessing the same file. These may therefore be combined in the simplified trace data such that when the benchmark application, including the simplified trace data, is tested, multiple instances of such patterns are taken to give the same testing results. This means that any testing is only carried out on the first such instance and, in the place of further testing to subsequent instances, the results of testing on the first instance are then applied to subsequent instances of such patterns. Thus saving time and reducing the processing burden.

Optionally, in an embodiment, the testing is carried out on the benchmark application in a benchmark suite and comprises inputting the benchmark application into the benchmark suite along with a user-modifiable input file, which sets control parameters of the benchmark suite.

In this embodiment, two files may be fed into a benchmark suite, which control the operation of the benchmark suite.

The first file is the benchmark application with the simplified trace data and information indicating where trace data have been combined, wherein the simplified trace data includes details of the phases. This helps to define the type of tests to be run by the benchmark suite. The second file is a general input file which is able to set more fine-grained control parameters for the tests.

Optionally, in an embodiment, the user-modifiable input file designates the phases to be tested and/or specifies a target execution time for each benchmark suite, and/or identifies trace data relating to any operations to be excluded from the testing.

This general input file can be generated automatically and can be modified by the user. The input file can be used:
 to enable or disable the testing of different phases in the benchmark application;
 to select which elements of the benchmark application are eligible for a performance test;
 to specify additional settings such as:
  any additional I/O specific tests to run;
  a target execution time (completion time) for each benchmark suite (test procedure).

Optionally, in an embodiment, producing the simplified trace data involves maintaining a first instance of a specific pattern in the simplified trace data and replacing subsequent instances, having similar patterns to the first instance, with an indication that the subsequent instance has been combined with the first instance.

When combining trace data having similar patterns, an indication may be provided of how the trace data are combined. Such indications are not tested and may indicate the result of testing the first instance of the trace data pattern, which is to be taken as the result for the trace data which has been replaced with the indication.

In an embodiment of a second aspect of the present invention, there is provided an apparatus for producing a benchmark application for testing input/output—I/O—settings of a computer application, the apparatus comprising: means for compiling trace data relating to operations to be executed by the computer application; means for grouping the trace data into one or more phases, based on different stages in the execution of the computer application to which the operations relate; means for identifying patterns in the trace data and comparing the patterns; means for producing simplified trace data in which trace data having similar patterns are combined; and means for outputting a benchmark application which includes the simplified trace data and information indicating where the trace data have been combined.

In any of the above aspects, the various features may be implemented in hardware, or as software modules running on one or more processors. Features of one aspect may be applied to any of the other aspects. The invention also provides a computer program or a computer program product for carrying out any of the methods described herein, and a computer-readable medium having stored thereon a program for carrying out any of the methods described herein. A computer program embodying the invention may be stored on a computer-readable medium, or it could, for example be in the form of a signal such as a downloadable data signal provided from an Internet website, or it could be in any other form.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 is a source code snippet showing an exemplary initialization phase;

FIG. 6 is a code sample relating to a parallel application using serial I/O by process 0 to perform I/O operations;

FIG. 7 is a code sample showing the I/O trace file, formatted as an XML file, generated from running the sample application of FIG. 6 with four MPI processes;

FIG. 8 is an example of similar patterns being combined according to an embodiment;

FIG. 9 is an example of an inefficient pattern in source code;

FIG. 10 is the trace file generated for the sample code of FIG. 9;

FIG. 11 is an example input file to specify control parameters for the benchmark suite, according to an embodiment;

DETAILED DESCRIPTION

Figure 1:
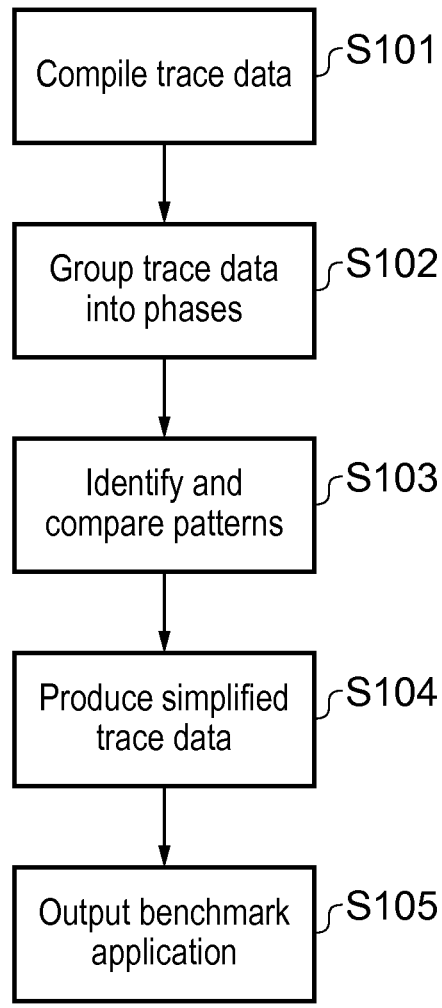
FIG. 1 is a flowchart showing the method of producing a benchmark application according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Testing of a computer application, such as testing input/output (I/O) settings of an application in a high performance computing architecture involving parallel processing, may be carried out by the following method.

FIG. 1 shows a simplified flowchart depicting the main steps involved in creating the benchmark application, which is closely related to a corresponding computer application, for the purpose of carrying out testing of various features of the benchmark application including input/output (I/O) settings.

The method involves identifying a computer application which is to be tested. Such a computer application will typically include many operations to be executed, some of which may be very different and others may vary only in minor details. Once a computer application is identified, a trace of the computer application is taken (S101). Taking a trace involves compiling trace data relating to the operations of the computer application. Trace data is in essence a copy of the original data relating to the operations. Trace data may however include information indicating the type, size, format, etc. of the original data which may substitute, or be provided in addition to, the copy of the original data. If desired, only data relating to I/O settings and processes may be copied to produce the trace data.

Once the trace data has been compiled it is then grouped into phases (S102). Each phase relates to the stages involved in the execution of the computer application. Phases may be set based on predetermined association between operations in the computer application, or may be set based on user input. Phases may further be divided into sub-phases in order to aid processing if for example a phase is of a particularly large size.

The trace data is then scanned to identify patterns in the trace data (S103). Patterns may for example be similar sequences of operations, operations involving accessing the same file or operations involving the transfer of a similar amount of data. Operations in this context include single operations and/or sequences of operations.

Once patterns in the trace data have been identified, the patterns are compared in order to identify similarities, and similar overall patterns. Such patterns are compared between phases to identify any operations, which are carried out in one phase, which are then repeated in a subsequent phase. In the case of the presence of only a single phase, a comparison is made between sub-phases within that phase.

Based on the comparisons made, duplicates, or effectively multiple instances, of similar patterns are identified. The trace data is the simplified by combining the identified similar patterns to produce simplified trace data (S104). Simplified trace data includes less data to be tested when compared with the trace data. The simplified trace however still represents the trace data in that the simplified trace data includes information indicating how and where patterns have been combined. But testing carried out on the simplified trace data includes testing the combined patterns. This means that re-running the tests at each instance of the similar patterns (as would be the case for the trace data) is not necessary.

Once the simplified trace data is produced, the simplified trace data and the related information are output in the form of a benchmark application (S105). A benchmark application is an application, or representative application, on which testing may be carried out.

Figure 2A:
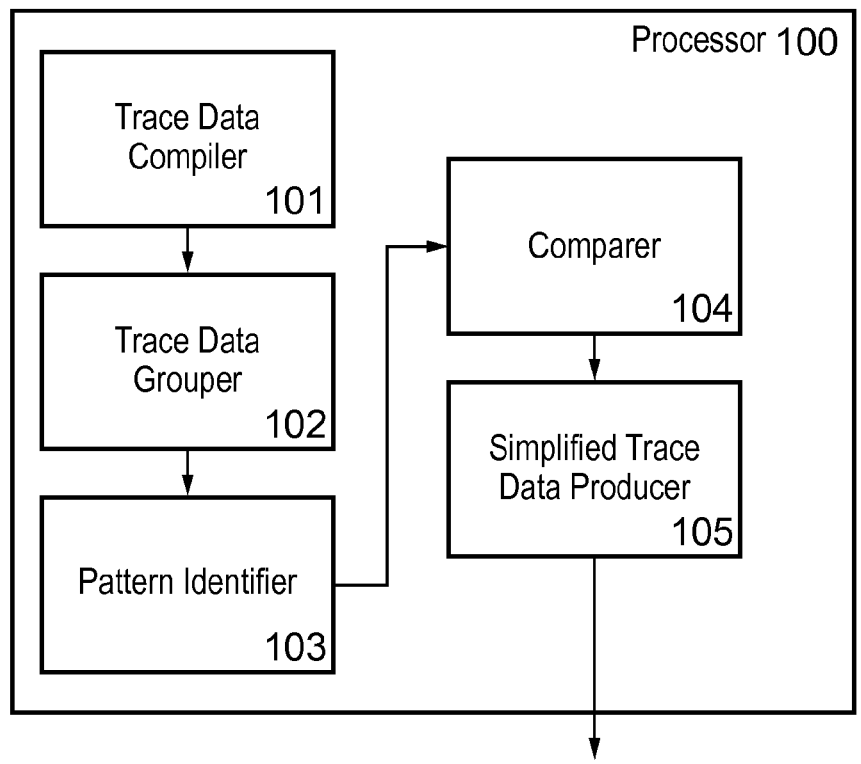
FIGS. 2A and 2B are block diagrams showing respectively a processor and processing apparatus according to an embodiment.
Figure 2B:
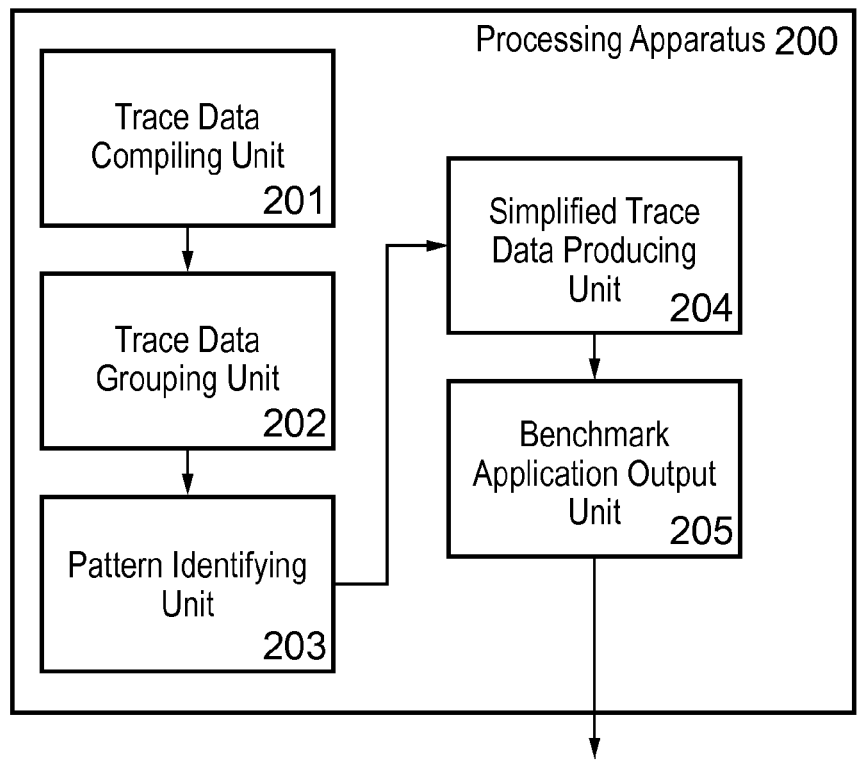

FIG. 2A shows an exemplary embodiment of the apparatus (processor) according to the invention on which the method shown in FIG. 1 may be carried out. In this embodiment, the processor 100 comprises a trace data compiler 101, a trace data grouper 102, a pattern identifier 103, a comparer 104 and a simplified trace data producer 105. The depicted arrows show the flow of data. FIG. 2B shows an alternative embodiment of the apparatus (processing apparatus 200) according to the invention on which the method shown in FIG. 1 may be carried out. In this embodiment, the processing apparatus 200 comprises a trace data compiling unit (means for compiling trace data) 201, a trace data grouping unit (means for grouping trace data) 202, a pattern identifying unit (means for identifying patterns) 203, a simplified trace data producing unit (means for producing simplified trace data) 204 and a benchmark application output unit (means for outputting a benchmark application) 205. The depicted arrows show the flow of data.

Figure 3:
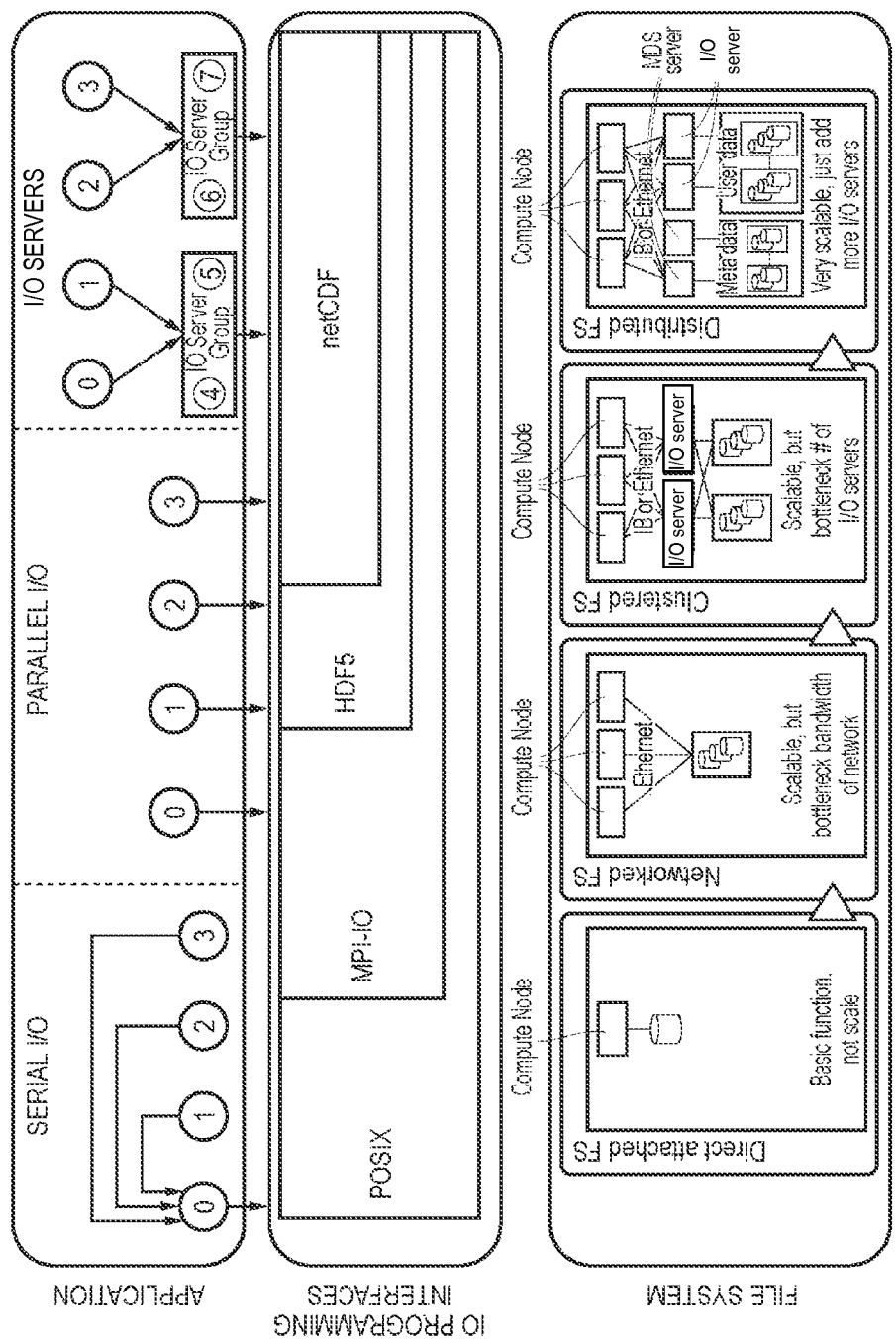
FIG. 3 is a block diagram showing an exemplary I/O system infrastructure.

An example of the architecture of a system on which an application, according to the present invention, is to be executed is shown in FIG. 3. FIG. 3 also shows some of the I/O design choices available for an application at three programming layers; the application programming layer, the I/O programming interface layer, and the file system layer.

Application Layer—At this layer one of three exemplary I/O programming styles may be used—serial I/O, where all data is gathered to a root process which then writes the data; parallel I/O, whereby each process concurrently writes its portion of data to a disk (this data can be written either to a single shared file or to a unique file for each process); and I/O servers, where one or more processes are assigned to exclusively handle I/O operations allowing write operations to be performed asynchronously by these processes while other processes continue with the calculation. The design decisions at the application programming layer also determine the file access pattern and transaction sizes (amount of data transferred to and from disk by each process)—for example write buffers may be used to ensure large, sequential write operations are performed.

I/O Interface Layer—At the I/O programming interface layer there are a number of application programming interfaces (API) available including the POSIX I/O interface for binary file I/O; the MPI (Message Passing Interface)—I/O interface which is built on top of the POSIX interface to give a parallel I/O programming style; and portable APIs such as netCDF and HDF5 which provide self-describing, machine-independent data formats.

File System Layer—The available hardware and system configuration determine the available options at the file system layer. Direct attached file systems, with disk connected directly to the compute nodes, give a non-scalable and non-parallel setup. Network file systems (e.g. NFS) are a more scalable solution but, as there is only one file system server there is a bottleneck at this server. Clustered file systems (e.g. GPFS), similar to network file systems but with several servers instead of just one, allow different clients to write to different servers. However there is a bottleneck at the server when a client writes one large file as this cannot be split between servers. Distributed file systems (e.g. Lustre, FEFS) are fully parallel file systems allowing scaling across multiple servers for both individual files and multiple clients.

As shown above there are many choices to consider when designing and implementing an application's I/O procedures. It is difficult to know the optimal settings without knowing the programming flow of the application and the I/O characteristics of the system on which the application is running. Moreover, it is impractical to run fully-fledged applications for testing and evaluation of I/O settings and solutions.

The present invention, in an embodiment, addresses these issues by extracting and identifying the details of the main I/O operations from an application. This information is analyzed to identify main I/O phases in the application (e.g. an initialization phase which comprises reading of input file plus and broadcast of the data to all computation processes) and to spot any inefficient I/O patterns (e.g. many small reads/write operations to the same file instead of a single larger read/write). The I/O phase information is then parameterized and fed into a benchmark suite which tests a range of I/O options at each of the three I/O layers shown in FIG. 3. These features allow the optimal I/O settings for the application running on a given system to be found in a thorough and efficient manner.

The present invention, according to an embodiment, helps to identify the optimal I/O settings for an application running on a given HPC system by simulating the I/O pattern of the application with different settings using the I/O benchmark suite.

Figure 4:
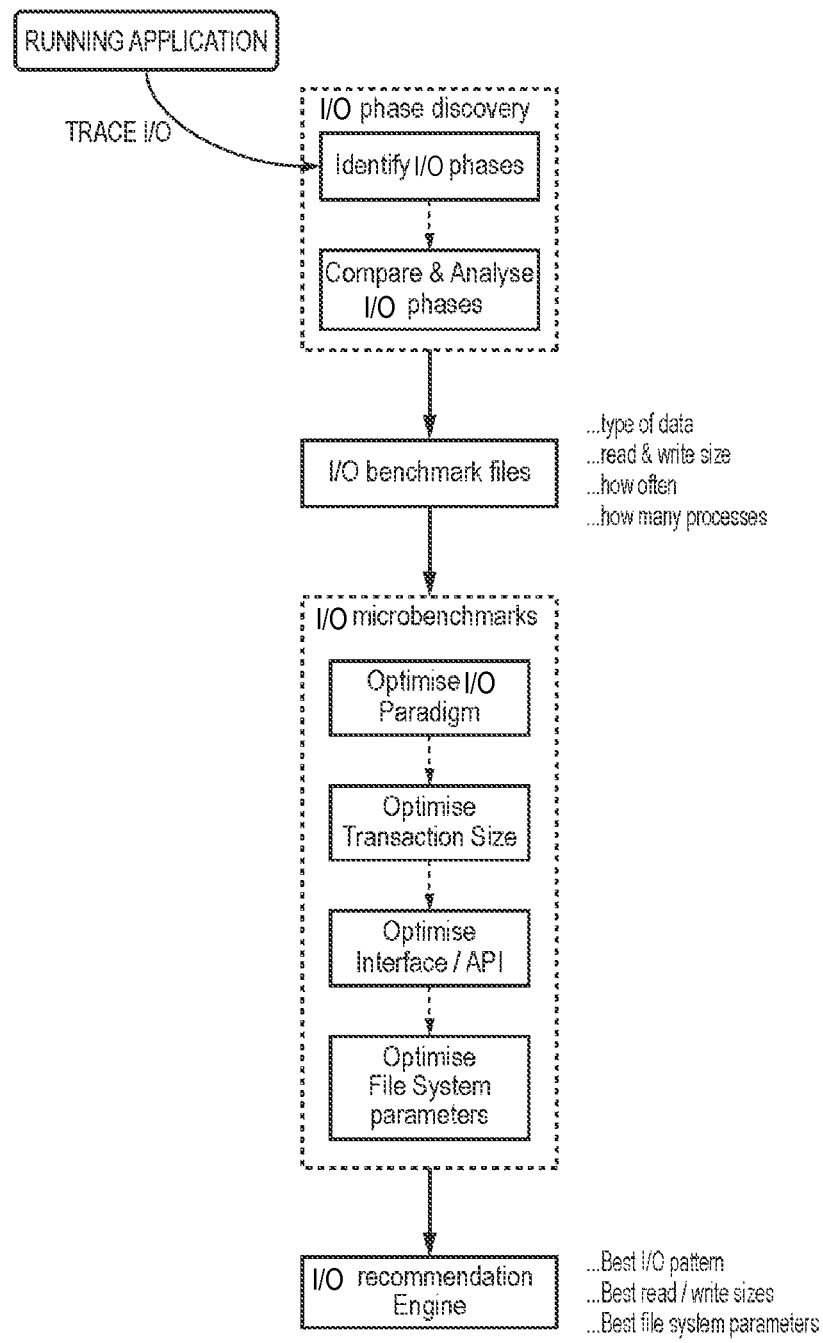
FIG. 4 is a flowchart showing in detail the steps of testing a benchmark application.

FIG. 4 shows a more detailed flowchart of the method according to an embodiment of the invention. This flowchart shows, in particular, steps involved in the testing of a benchmark application.

In the embodiment shown in FIG. 4, a trace is taken of the I/O operations (i.e. recording a chronology or when and where I/O events occurred) performed by an application during execution. The trace data is then processed to identify the I/O phases of the application. The different I/O phases are then analyzed and compared (see "I/O phases" section below for further detail).

This allows any inefficient I/O patterns in the application to be spotted, and different I/O phases with similar operations to be identified, so as to reduce the number of tests that are performed in the subsequent benchmarking stage. The trace and I/O phase data is then fed into a benchmark suite which emulates the I/O elements (e.g. disk access pattern, file type, file size, transaction size) of the application. Using this information, the benchmark suite studies the performance effect of changing settings, for example across each of the three I/O layers as shown in FIG. 3.

Upon completion of the benchmark suite for each phase, the optimal I/O settings for the application may be identified. Recommendations on the settings for application execution or for potential code optimizations can then be reported.

In the context of FIG. 4, an I/O phase may group the operations required to access a single file or a group of related files at a particular stage of an applications execution. As well as system I/O operations (e.g. read( ), write( )), an I/O phase may also include any associated operations such as communication required in gathering or scattering the data.

For scientific applications, I/O phases may include: an initialization phase where an input file is read; a time-stepping phases where the measurements or statistics for the scientific system are periodically written to file; and a finalization/close-down stage (phase) where final measurement files may be written for post-processing and where restart files are written to allow a simulation to continue from where it left off.

FIG. 5 shows a sample source code snippet for reading an input file and distributing data to each process. The phase includes scattering of data from process 0 to all other processes, as well as opening and reading the file. All lines of this sample code, shown in FIG. 5, would be classed as a single I/O phase (e.g. the initialization phase). The operations that comprise this phase are the open( ) and read( ) operation performed by process 0 and the MPI_SCATTER( ) operation called by all processes.

A more detailed description of some of the method steps according to an embodiment of the invention are described below.

Trace application—An initial step involves an I/O tracing utility. This utility may work on a running application. It extracts and saves the chronology of I/O operations that occur during execution. The information captured may include the type of data (the API used); the size of the data read or written; which processors took part in the operation. Associated operations such as any communications required in gathering or scattering the data are also able to be captured.

I/O phase discovery—The output of the tracing utility is analyzed so as to characterize and split I/O operations into phases (e.g. initialization phase, time-stepping phase, and finalization/close-down stage) depending on the application execution. The I/O phase information is then written to an I/O trace report file. An example parallel application which uses serial I/O operations is shown in FIG. 6. This example program has two I/O phases—the initialization stage which reads a restart file to setup the parameters for the calculation and the I/O performed calculation stage which writes out restart files are regular time-step intervals.

FIG. 7 shows an example of an I/O trace report file generated after the I/O phase discovery stage for the sample application when run with 4 processes with an input file of 256 MB. As an example, the trace file is formatted as an XML file. Other output file formats are also possible—the main requirement for the trace file is that it is capable of being read by I/O benchmark suite. There is an input in the trace report file for each I/O phase identified and the phase includes the gathering and scattering of data where appropriate.

To implement this feature, tracking of the operations before and after the I/O instructions that access files within the trace utility, is desirable, so that any associated operations (e.g. communication) are found. One possible way to do this is to enable trace capturing based on tracking the memory reference of a buffer involved in the I/O instruction. In this way any communications involving the buffer are captured and added to the trace output. To aid more accurate identification of I/O phases a time window could be places before and after the I/O instructions.

I/O phase analysis—Once the I/O phases have been identified from the application trace and the details written to the I/O trace file, an analysis of the trace file then takes place. During the analysis, a comparison is made between the different I/O phases in the file to find phases that are comprised of similar operations.

This comparison has two purposes. Firstly, to reduce the number of benchmarks that are run by finding I/O phases that use the same set of operations, involve the same or similar processes and read/write similar amounts of data. This helps to reduce the turnaround time of the benchmark suite. FIG. 8 shows how the I/O phase analysis works on the I/O trace file generated, for the code shown in FIG. 6, by combining the similar restart_dump_1 and restart_dump_2 phases into a single restart_dump phase. Secondly, to identify inefficient I/O patterns in the application. This is done by finding successive I/O phases involving the same set of operations and the same set of processes that access the same file. From this information a new I/O phase is created which combines these phases into a single phase with larger I/O operations. This new phase is added to the I/O trace file and will be benchmarked to compare the performance effect. A sample source code snippet and corresponding I/O phase trace file for an example of an inefficient I/O pattern are shown in FIG. 9 and FIG. 10, respectively. Data from a restart file is read in small chunks by one process and then sent to the one of the processes. The right-hand text box in FIG. 10 shows an additional I/O phase generated during the I/O Phase Analysis stage after identifying the potentially inefficient I/O pattern. This new phase has grouped operations so that data is read and sent to remote processes in larger chunks.

Benchmark file and input file settings—Two files are fed into the benchmark suite to control its operation. The first file is the benchmark trace file (benchmark application) with details or the I/O phases for the application, as well as any new or modified phases generated during the I/O Phase Analysis stage, as described above. This defines the type of benchmarks to be run by the benchmark suite. The second file is a general input file which sets more fine-grained control parameters for the benchmarks.

FIG. 11 shows a sample input file for the example program and benchmark trace file described earlier. The key points for this file are:
- the location of the benchmark trace file is specified under the benchmark_file parameter;
- the enable_phase and disable_phase parameters together requests that only tests related to the initialization and restart_dump_1 I/O phases will be run;
- the application_layer specifies that parameter sweep tests at this layer should include tests for the serial I/O, parallel I/O and I/O server programming model as well as testing for varying values of transaction size and I/O buffer sizes;
- the api_layer parameter specifies that just the POSIX API tests should be run at this layer;
- the fileSystem_layer parameter lists the different file systems together and their path where the I/O tests will be run—here the tests are run on an NFS and a Lustre file system.

Figure 12:
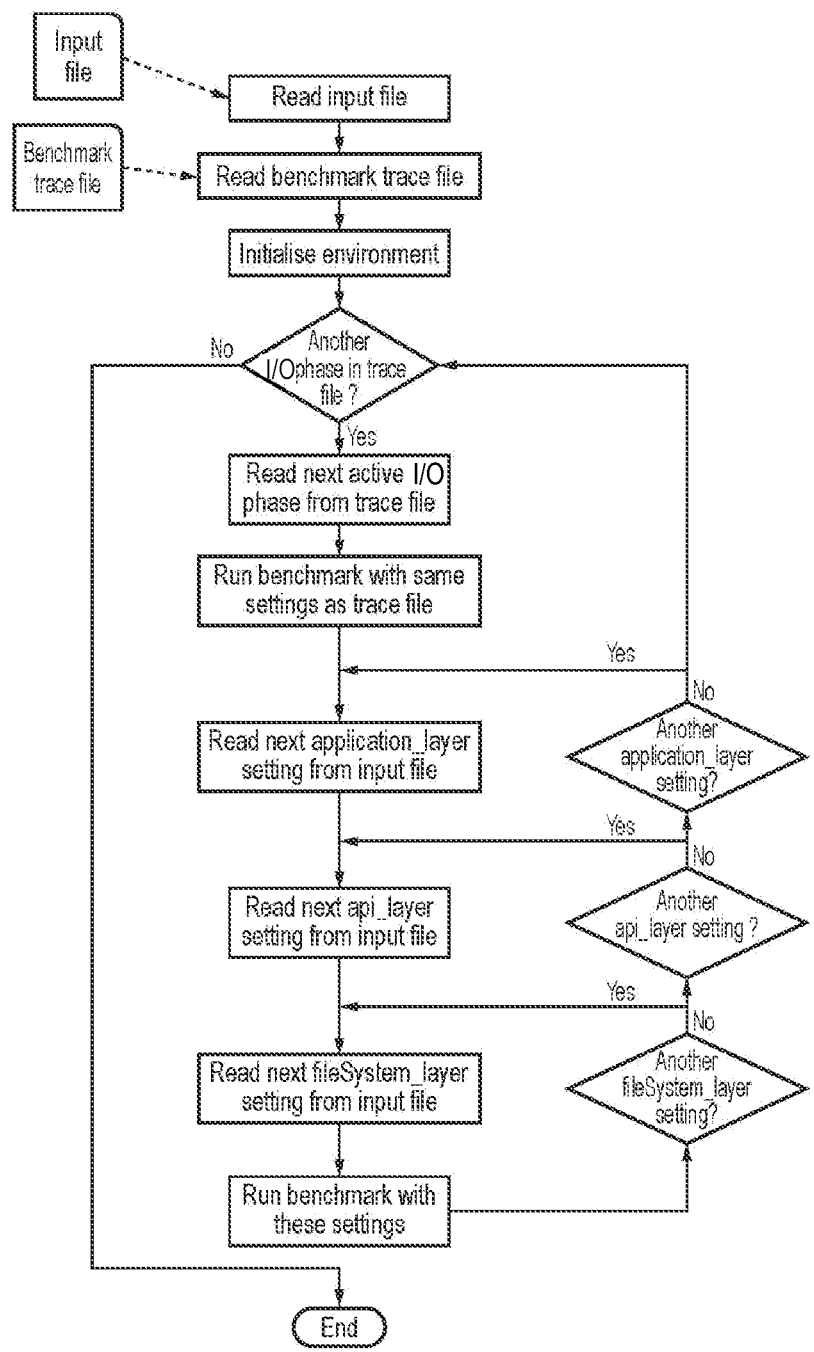
FIG. 12 is a flowchart showing steps involved in carrying out the benchmark suite.

Benchmark Suite—FIG. 12 shows an exemplary flowchart for the I/O benchmark suite component according to an embodiment. As shown, first the input file and benchmark trace file are read to set the benchmark settings and control parameters. This information is used to initialize the benchmark runtime environment; this includes the setup of the parallel environment (e.g. MPI processes, threading environment) and creating directories or files in each file system to be tested. There is then a loop over each active I/O phase in the benchmark trace file (active means that the I/O phase is listed under the enable_phase parameter in the input file). For each phase the benchmark is first run with same settings as in the trace file in order to get a baseline time for the operation and to compare with the timing information from the trace file. In the next steps of the flowchart a benchmark test is constructed and run for each combination of settings across the three layers of the I/O hierarchy. The times of each test are saved for a comparison and analysis with the baseline time. The benchmark kernels/tests fit into a benchmarking framework which ensures that reproducible and statistically accurate performance results are generated for each test.

Before running each benchmark kernel, the framework sets a minimum target time for which the kernel should run. A number of test repetitions are then performed. If the execution time of these repetitions is less than the target time the result is discarded and the test re-run with twice the number of repetitions. The framework is also responsible for setting up the environment before the test kernel is run—this includes creating file of the correct format and size for write tests.

Figure 13:
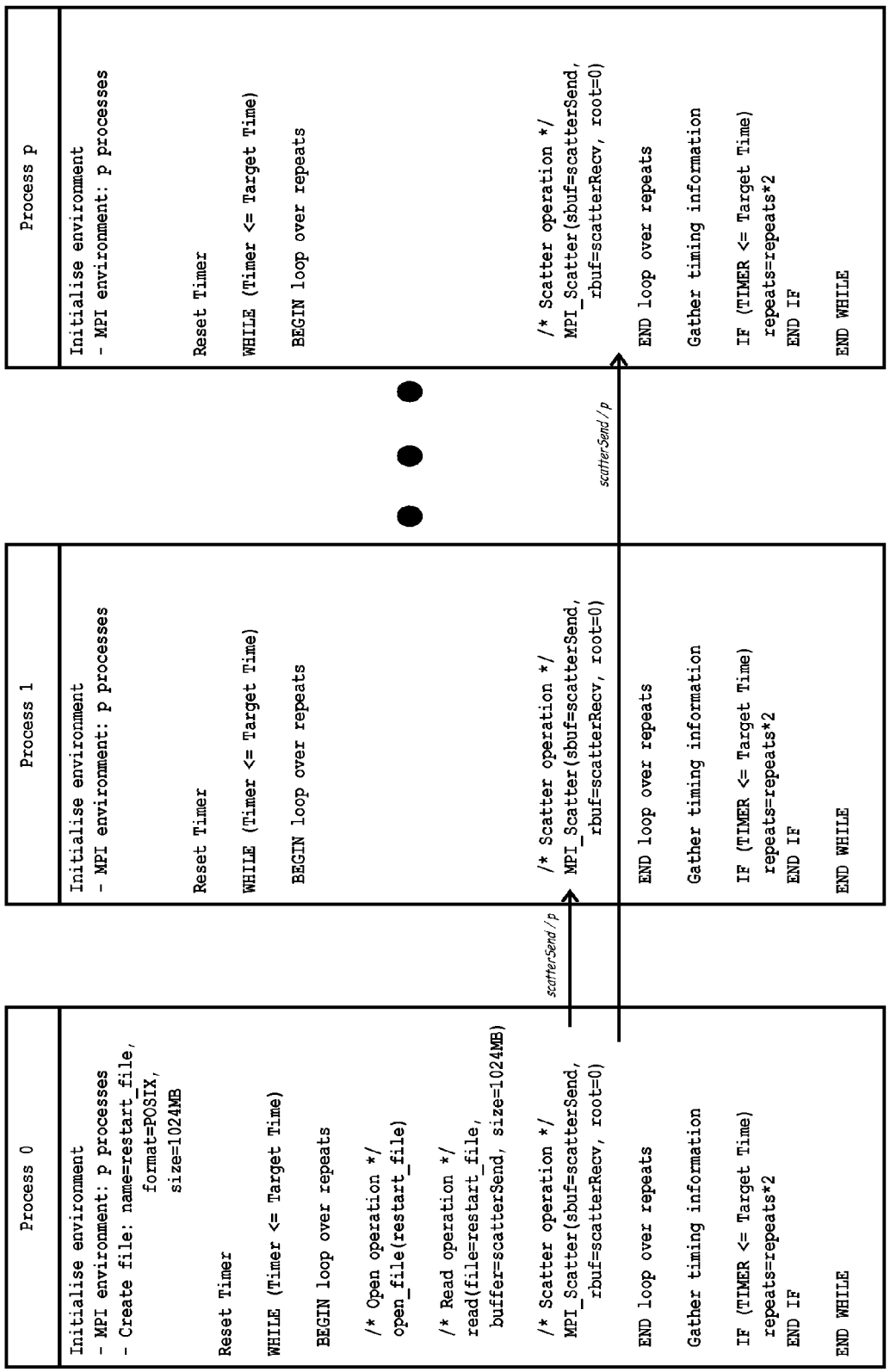
FIG. 13 is an example of pseudo-code for the initialization phase of the sample code shown in FIG. 6.

FIG. 13 shows an example of the pseudo-code for the initialization phase of the sample code shown in FIG. 6 above. In this Figure lines 2-5 and 9-16 of code in process 0, and lines 2 and 6-8 in process 1 and each subsequent process (p), are provided by the benchmark suite framework while unformatted code needs to be coded for each kernel test. The code for each test can be constructed either manually by implementing a set of interfaces or automatically by extracting the operations from the benchmark trace file.

Recommendation engine: benchmark result analysis & reporting—The invention further includes, in an embodiment, a recommendation engine which identifies the optimal settings and type of system on which to run the application. The recommendation engine may include of two parts—benchmark result analysis and recommendation reporting.

Benchmark result analysis—At the end of each benchmark kernel execution, information from the run is extracted and saved to generate a report and recommendations on the optimal I/O settings. Information saved includes details of which I/O phase in the benchmark trace file was tested, the configuration settings for the kernel (e.g. the settings at each layer of the I/O hierarchy) and any performance information for the test, e.g. benchmark execution time or I/O bandwidth achieved.

Figure 14:
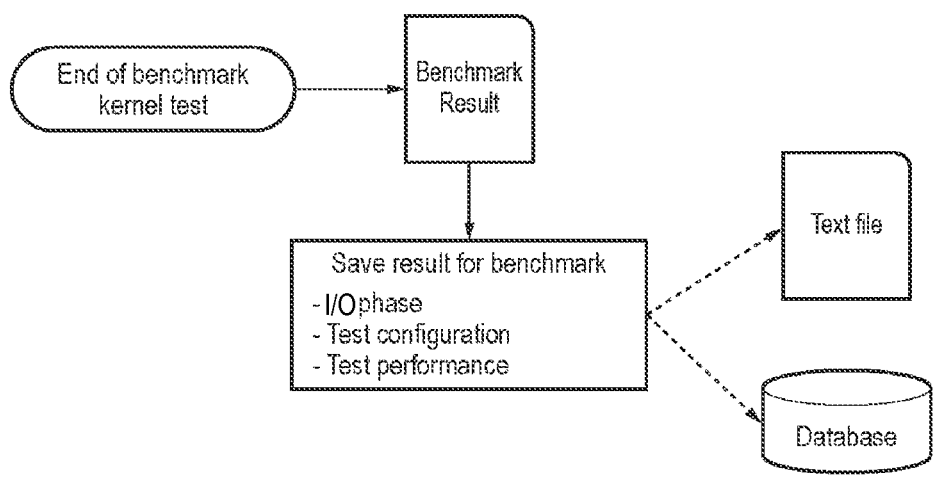
FIG. 14 is a flowchart showing the process and the types of information saved after
Figure 15:
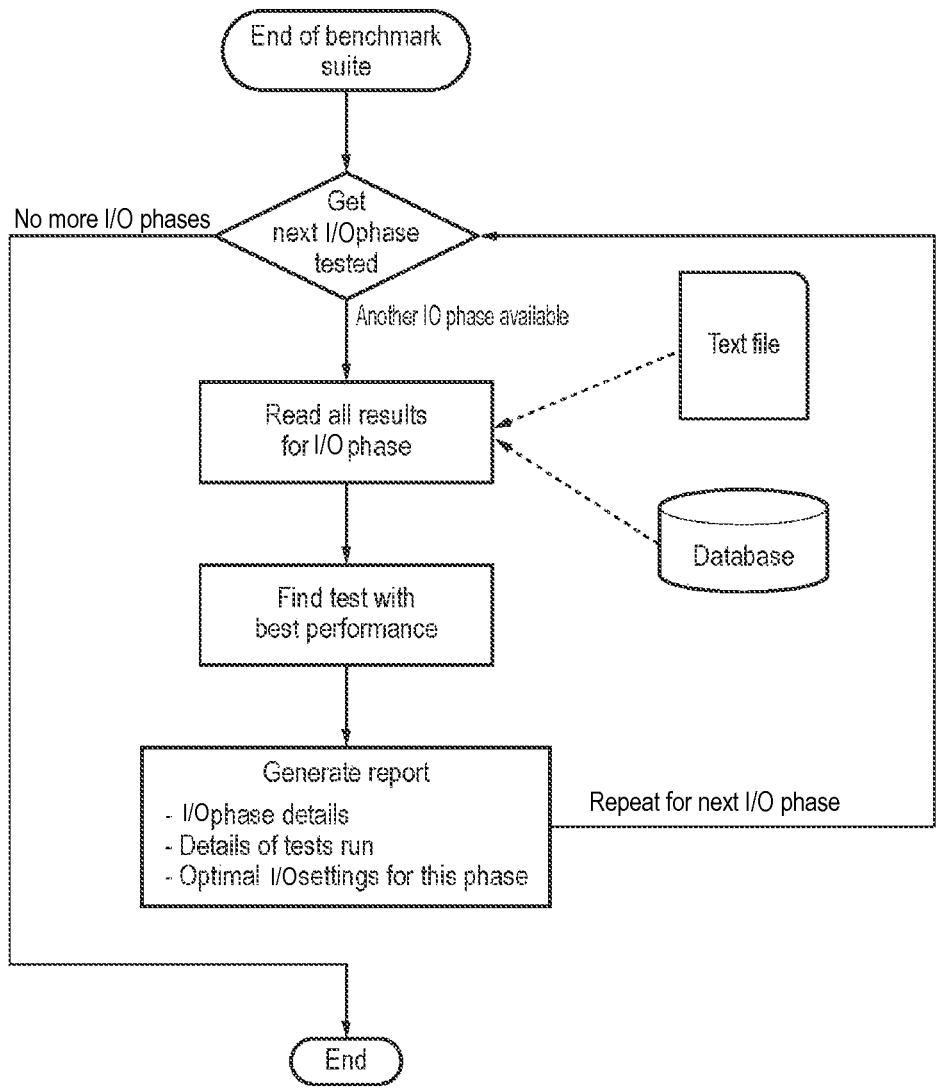
FIG. 15 is a flowchart showing the result analysis and report generation according to an embodiment.

The information can be saved to a text file or a database. This allows the benchmark data to be accessed and analyzed between different invocations of the benchmark suite. Alternatively, the information can be kept in working memory, used for this single invocation of the benchmark suite and then discarded after the reporting stage. FIG. 14 shows an example of the flow for the saving of benchmark results after each benchmark kernel completes. After the benchmark suite finishes, the saved results are analyzed to find the best settings and configuration for each I/O phase. FIG. 15 shows an exemplary flowchart of this process.

Recommendation reporting—Once the optimal settings for each I/O phase are found a report is generated. This report will be output in a standard format and contains the details about the I/O phase, the benchmarks run for the I/O phase and details of the settings at each layer of the I/O hierarchy to achieve improved performance.

The report can be fed back to developers to suggest possible areas to improve the I/O performance of their application. The report can also help to identify potentially optimal settings for the application running on a particular system (such as the best hardware or file-system to run the application). This information could be added to a job scheduler profile or HPC workflow and used to allow automatic execution the application with the most optimal I/O settings for the system.

Although aspects of the invention are discussed separately, it should be understood that features and consequences thereof discussed in relation to one aspect are equally applicable to the other aspects. Where a method feature is discussed, it is taken for granted that the apparatus embodiments include a unit or apparatus configured to perform that feature or provide appropriate functionality, and that programs are configured to cause a computing apparatus on which they are being executed to perform said method feature.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of producing a benchmark application for testing input and output (I/O) settings of a computer application, the method comprising:
by one or more hardware processor;
compiling trace data relating to operations to be executed by the computer application;
grouping the trace data into one or more phases, based on different stages in an execution of the computer application to which the operations relate;
identifying patterns in the trace data and comparing the patterns;
producing simplified trace data in which trace data having similar patterns are combined; and
outputting a benchmark application which includes the simplified trace data and information indicating where the trace data have been combined;
testing the benchmark application to establish a performance of benchmark operations of the benchmark application; and
wherein the testing of the benchmark application further includes testing I/O settings of the benchmark application to identify one of or both of characteristics of a system and inefficiencies in data flow in the system, on which the computer application is executed.

2. The method of claim 1, further comprising:
outputting a report indicating one of or both of performance of the benchmark operations and comprising recommendations for I/O settings, specific to each system on which the computer application is operable to be executed, for use in improving data flow.

3. The method of claim 2, wherein the report comprises recommendations regarding at least one of access patterns, types of files to be read and written, sizes of files to be read and written, transaction sizes, and timings.

4. The method of claim 3, wherein the testing of the benchmark application includes studying an effect on performance of changing I/O settings.

5. The method of claim 4, wherein, where trace data having similar patterns have been combined, the testing of the benchmark application involves only testing a first instance of the trace data having a similar pattern and a result of testing the first instance of the trace data having a similar pattern is then applied to subsequent instances.

6. The method of claim 5, wherein the testing is carried out on the benchmark application in a benchmark suite and comprises inputting the benchmark application into the benchmark suite along with a user-modifiable input file, which sets control parameters of the benchmark suite.

7. The method of claim 6, wherein the user-modifiable input file designates one of or both of phases to be tested and specifies a target execution time for each benchmark suite, and identifies trace data relating to any operations to be excluded from the testing.

8. The method of claim 7, wherein the compiling of the trace data further comprises extracting a chronology of operations that occur during execution of the computer application.

9. The method of claim 8, wherein the trace data comprises information indicating one of or both of a type and size of the data, relating to the operations, being read or written.

10. The method of claim 9, wherein the trace data are grouped into at least an initialization phase, relating to reading input files, and a finalization phase, relating to writing re-start files, which allow operations to re-start following completion of testing.

11. The method of claim 10, wherein comparing patterns between phases comprises identifying phases including similar sets of operations which each involve accessing a same file.

12. The method of claim 11, wherein producing the simplified trace data involves maintaining a first instance of a specific pattern in the simplified trace data and replacing subsequent instances, having similar patterns to the first instance, with an indication that a subsequent instance has been combined with the first instance.

13. An apparatus for producing a benchmark application for testing input and output (I/O) settings of a computer application, the apparatus comprising one or more hardware processor and:
    means for compiling trace data relating to operations to be executed by the computer application;
    means for grouping the trace data into one or more phases, based on different stages in an execution of the computer application to which the operations relate;
    means for identifying patterns in the trace data and comparing the patterns;
    means for producing simplified trace data in which trace data having similar patterns are combined; and
    means for outputting a benchmark application which includes the simplified trace data and information indicating where the trace data have been combined;
    means for testing the benchmark application to establish a performance of benchmark operations of the benchmark application,
    wherein the testing of the benchmark application further includes testing I/O settings of the benchmark application to identify one of or both of characterisitics of a system and inefficiencies in data flow in the system, on which the computer application is executed.

* * * * *